United States Patent [19]

Horne et al.

[11] Patent Number: 4,845,993
[45] Date of Patent: Jul. 11, 1989

[54] WIND TUNNEL BALANCE

[75] Inventors: Warren L. Horne, Tullahoma, Tenn.; Nans Kunz, Fremont, Calif.; Phillip M. Luna, San Jose, Calif.; Andrew C. Roberts, Milpitas, Calif.; Kenneth M. Smith, Manchester, Tenn.; Ronald C. Smith, Sunnyvale, Calif.

[73] Assignee: The United States of America as represented by the Administrator of the National Aeronautics and Space Administration, Washington, D.C.

[21] Appl. No.: 195,563

[22] Filed: May 18, 1988

[51] Int. Cl.$^4$ ............................................. G01M 9/00
[52] U.S. Cl. ..................................................... 73/147
[58] Field of Search .......................................... 73/147

[56] References Cited

U.S. PATENT DOCUMENTS 3,447,369 6/1969 Horanoff ............................... 73/147
3,878,713 4/1975 Mole ..................................... 73/147

Primary Examiner—Donald O. Woodiel
Attorney, Agent, or Firm—Darrell G. Brekke; John R. Manning; Charles E. B. Glenn

[57] ABSTRACT

A flow-through balance is provided which includes a non-metric portion and a metric portion which form a fluid-conducting passage in fluid communication with an internal bore in the sting. The non-metric and metric portions of the balance are integrally connected together by a plurality of flexure beams such that the non-metric portion, the metric portion and the flexure beams form a one-piece construction which eliminates mechanical hysteresis between the non-metric and the metric portion. The system includes structure for preventing the effects of temperature, pressure and pressurized fluid from producing asymmetric loads on the flexure beams. A temperature sensor and a pressure sensor are located within the fluid-conducting passage of the balance. The system includes a longitudinal bellows member connected at two ends to one of (1) the non-metric portion and (2) the metric portion and at an intermediate portion thereof to the other of (1) and (2). A plurality of strain gages are mounted on the flexure beams to measure strain forces on the flexure beams. The flexure beams are disposed so as to enable symmetric forces on the flexure beams to cancel out so that only asymmetric forces are measured as deviations by the strain gages.

14 Claims, 5 Drawing Sheets

WIND TUNNEL BALANCE

FIELD OF THE INVENTION

This invention relates to a aerodynamic wind tunnel balance for aerodynamic studies on a model flight vehicle, and more particularly, to the measuring of aerodynamic forces on a wind tunnel model while supplying pressurized fluid to the model as it is supported in the wind tunnel and measuring the forces acting thereon.

BACKGROUND OF THE INVENTION

Wind tunnel models use strain gage balances to measure the aerodynamic forces and moments produced by the model in the flow stream at various angles of attack and side slip. The balances are normally attached to the end of a sting in the wind tunnel test section and the model is built around the balance. Powered model testing has encountered great difficulties in maintaining high quality mesurement of these aerodynamic forces and moments on wind tunnel models, because fluid, at high pressures and temperatures (i.e., hydraulic fluids, high pressure air, Freon, water, nitrogen, etc.), passes through the balances to power the wind tunnel model aircraft.

Heretofore, attempts to pass high pressure fluids across the metric break (the junction between the non-metric portion of the balance connected directly to the sting of fixed portion of the mount and the metric portion of the balance connected to the model) of the wind tunnel model balances has taken two forms. The two forms are "flow-through" and "flow-around." Flow-through balances have the pressurized fluid passing through an internal portion, normally the center, of the balance. Flow-around balances have pressurized fluid moving around the outside of the balance.

Also previous balances have suffered from disadvantages in that mechanical hysteresis inevitably develops at the metric break since the metric and non-metric portions were two separate pieces mechanically connected together. This hysteresis resulted in poor accuracy of the measurement system. In addition, both of the prior art type balances discussed above are significantly affected by the effects of temperature, pressure and momentum of the pressurized fluid flowing through the balance and passing across the metric break. Also in the prior art, it was believed that thermal deviation effects could be derived from the temperature of the flexure beams but this proved to be only roughly accurate.

As a result, in the prior art attempts to develop a flow-through or flow-around wind tunnel balance, the pressure, temperature, and momentum effects could not be sufficiently well accounted for to achieve sufficient accuracy or accuracy comparable to current wind tunnel balances without flow. This in turn has forced those using these flow type balances to accept balance data with significant uncorrectable errors and/or increased wind tunnel time to reduce thermal effects.

It is therefore an object of the present invention to provide a new and improved wind tunnel balance which substantially overcomes the above-described deficiencies in the prior art.

SUMMARY OF THE INVENTION

The present invention overcomes the above-described problems associated with flow-type balances. The present invention provides a balance which has a higher degree of accuracy due to a single-piece configuration which eliminates mechanical hysteresis. This single-piece construction is made possible by the use of the Electric Discharge Machining (EDM) process. Furthermore, the output of the balance provides correction for the combined effects of temperature, pressure and pressurized fluid momentum, thus allowing the resulting balance measurements to be of the same accuracy as state-of-the-art non-flow wind tunnel model balances. In addition, the invention employs a longitudinal bellows which provides an isolation of flow effects from the balance system. The invention employs temperature sensors located in the plenum, since applicants have discovered that the measured temperature deviations in this flow-thru balance is directly related to the static temperature in the balance plenum. This relation is attributed to the bellows thermal expansion or compression causing the measured force deviations. The invention also employs a pressure sensor located in the plenum, which accounts for the pressure-induced force deviations. Measuring the temperature and pressure in the plenum enables a correction algorithm to be developed. The present invention has multiple applications including powering propulsion simulators on wind tunnel models and matching jet exhaust flows for missles, rockets and other aerospace vehicles while being tested in wind tunnels.

According to the present invention, a force measurement system is provided which includes a fluid source, adapted to be connected to a sting having an internal bore, for feeding pressurized fluid through the bore in the sting; and a flow-through balance for measuring forces acting on a model flight vehicle to be mounted on the balance. The balance includes a non-metric frame means, for mounting the balance on the sting, including a first non-metric frame element, and a metric frame means, for securing the model flight vehicle to the balance, including a first metric frame element, the non-metric frame means and the metric frame means together including a fluid-conducting passage comprising a metric portion and a non-metric portion in fluid communication with the bore in the sting, for conveying the pressurized fluid first through the non-metric portion of the passage and then into the metric portion thereof. The first non-metric frame element and the first metric frame element are integrally connected together by a plurality of flexure beams such that the first non-metric frame element, the first metric frame element and the flexure beams form a one-piece construction comprising means for eliminating mechanical hysteresis at the flexure beams which connect the first non-metric frame element and the first metric frame element.

The system preferably includes a stress control means for substantially the effects of temperature, pressure and pressurized fluid from producing asymmetric internal forces in the fluid passage and asymmetric loads on the flexure beams. The stress control means can comprise a predetermined internal geometric configuration of the fluid-conducting passage, a temperature sensor means, disposed in the fluid conducting passage, for measuring the temperature of fluid flowing through the balance, and a pressure sensor means, disposed in the fluid conducting passage, for measuring the pressure of fluid flowing through the balance. The force measurement system can further include a longitudinal bellows member connected at two ends to one of (1) the first non-metric frame element and (2) the first metric frame element and connected at an intermediate portion to the other of (1) the first non-metric frame element and (2) the first metric frame element.

A plurality of strain gages are mounted on the flexure beams, for measuring strain forces caused by aerodynamic forces acting on the model flight vehicle. The first non-metric frame element and the first metric frame element can be coaxial with each other and the flexure beams can be disposed substantially symmetrically about a common axis of these frame elements to enable symmetric forces on the beam to cancel out so that only asymmetric forces are measured as deviations by the strain gages.

The first metric frame element can be a substantially cylindrical hollow balance shell and the fist non-metric frame element can include a substantially cylindrical hollow member disposed substantially concentrically within the balance shell, and the flexure beams can connect adjacent ends of the balance shell and the hollow member. The balance can be mounted on the sting by means of the first non-metric frame element which is mounted partially within the internal bore in the sting. The non-metric portion can further include a second non-metric frame element which is a substantially cylindrical hollow member fitted within the first non-metric frame element and having an open end disposed within the internal bore in the sting and a closed end.

The balance can further include a bellows assembly including (1) a bellows housing, (2) a bellows means, and (3) a bellows cover. The bellows housing is connected to the balance shell and has a substantially cylindrical hollow portion disposed concentrically with the balance shell such that the substantially cylindrical hollow member of the second non-metric frame element is disposed between the balance shell and the substantially cylindrical hollow portion of the bellows housing. The bellows cover is connected to the bellows housing and disposed concentrically with the balance shell, the substantially cylindrical hollow member of the first non-metric frame element and the bellows housing, such that the bellows means is disposed longitudinally of a main flow direction of the fluid-conducting passage of the balance. The bellows means includes a plurality of perforated bellows inserts located at an intermediate section of the bellows means. The bellows inserts are disposed within adjacent bores in the second non-metric frame element, the bellows means and the bellows cover to allow fluid communication from the non-metric portion of the balance to the metric portion of the balance. The balance can further include an end cap connected to the first symmetric frame element and the bellows housing and a motor mount connected to the end cap.

The flexure beams are configured to allow any symmetric stresses produced within the balance to be cancelled out. The fluid-conducting passage within the balance is arranged so as to enable a reduction in asymmetrical internal forces generated by the fluid flow through the balance and to yield primarily symmetrical stresses produced by a fluid flowing through the balance. That is, the fluid-conducting passage has internal geometry such that the majority of flow-induced forces develop in a symmetrical manner, thus minimizing the effects of flow on the balance and also such that the pressure and thermally developed stresses are symmetrical in cooperation with the flexure beam construction which has the strain gages mounted thereon so that asymmetrical forces are measured as deviations by the strain gages. While asymmetric stresses produced by the fluid flow characteristics are minimized by the above features, any asymmetric stresses developed by the pressurized fluid flow temperature and pressure are further minimized by providing a temperature sensor and pressure transducer positioned to measure the static temperature and pressure of the fluid flow. These measurement means, and in addition a rate-flow venturi, allow for measurement of the same factors that cause asymmetric stresses in the balance. As a result, correction algorithms can be employed based on the static temperature and pressure measurements.

The balance according to the invention is machined by an Electric Discharge Machine (EDM) technique so that the balance is formed from a single steel block, producing a complex metric break within the balance and eliminating mechanical hysteresis. This elimination of mechanical hysteresis yields improvements in accuracy of the balance according to the invention in comparison with heretofore known wind tunnel balances by a factor of five.

The present invention also provides for accuracies better than 0.5% of the component's full-scale load with high pressure (up to 1500 psi) flow through the balance in a temperature range of 30° F.–170° F. and mass flows in excess of 14 lbs/sec. The invention also allows for accuracies better than 0.1% of the components full-scale load with no flow through the balance due to the elimination of mechanical hysteresis. The positioning of temperature sensors and pressure transducers within the fluid conducting passage of the balance enables correction for asymmetric internal stresses produced by the thermal and pressure condition of the fluid flow. The wind tunnel system according to the invention can be used with extreme flow pressures and temperatures without damaging the bellows assembly while maintaining minimal asymmetric stress to the internal portions of the balance.

BRIEF DESCRIPTION OF THE DRAWINGS

The above and other objects, advantages and features of the invention will be more fully understood when considered in conjunction with the following discussion and the attached drawings, of which.

DETAILED DESCRIPTION OF THE INVENTION

The flow-through balance to the invention is especially adapted to measure the aerodynamic forces generated by an advanced prop fan, full-span transport model with two powered propulsion simulators, with the objective being to measure the power effects on the stability and control characteristics.

Figure 1:
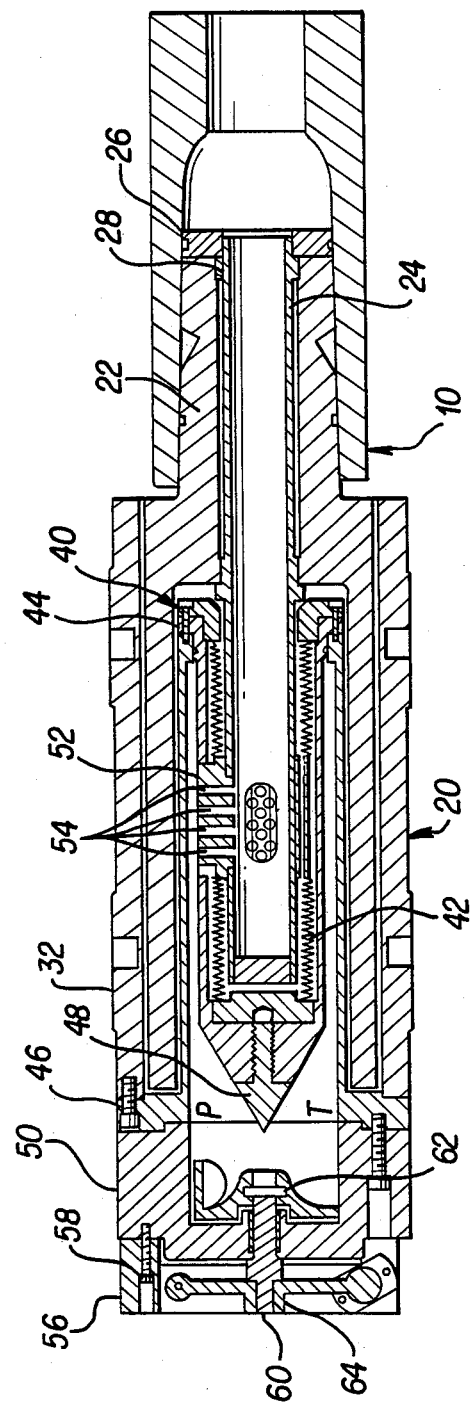
FIG. 1 is a side view in longitudinal cross section of the force measurement system according to the invention.
Figure 2:
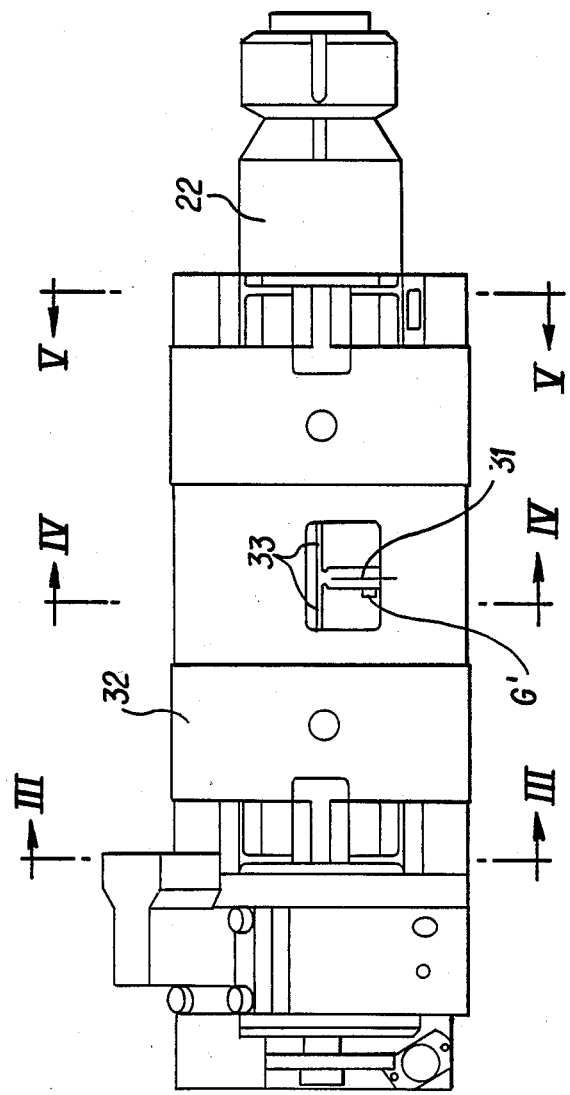
FIG. 2 is a side view of the force measurement system according to the invention.
Figure 5:
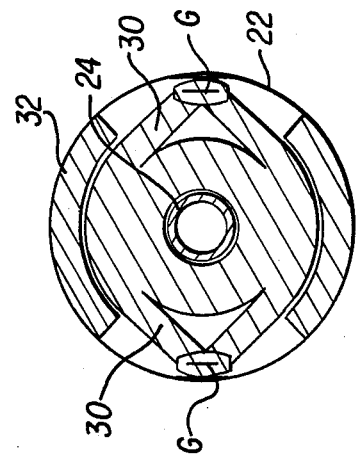
FIG. 5 is a view of section V—V of FIG. 2.
Figure 4:
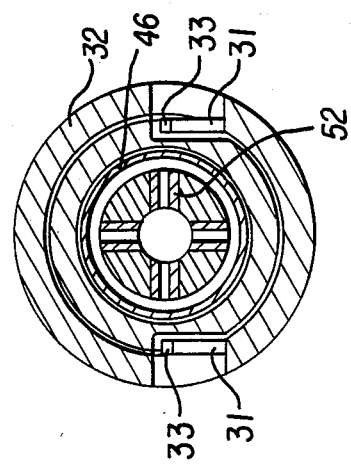
FIG. 4 is a view of section IV—IV of FIG. 2.
Figure 3:
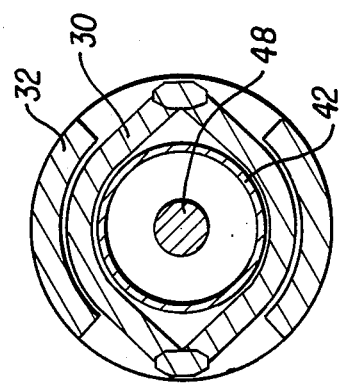
FIG. 3 is a cross sectional view of section III—III of FIG. 2.
Figure 6:
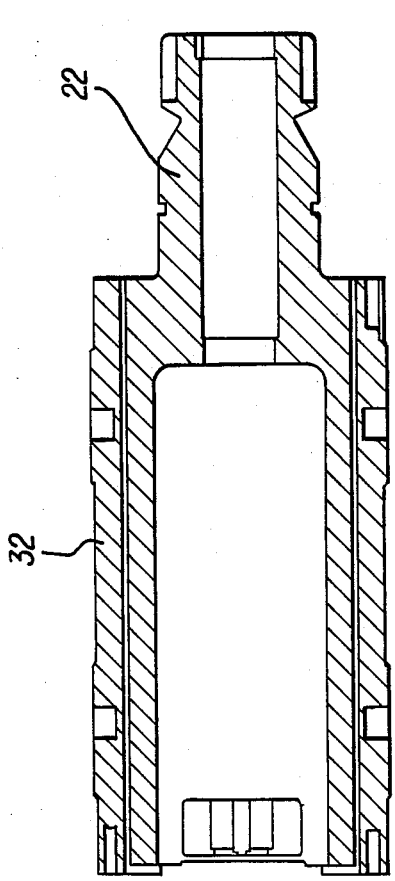
FIG. 6 is a side view in longitudinal cross section showing additional details of a portion of the present invention.
Figure 7:
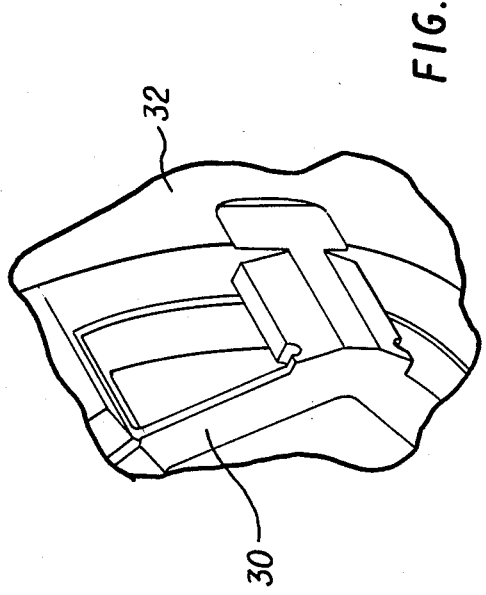
FIG. 7 is a perspective view illustrating the relationship between the non-metric portion of the balance, the metric portion of the balance and the connecting flexure beams.

Referring now to the drawings, FIG. 1 shows a sting 10 to which a balance 20 is mounted. Sting 10 has an internal bore with the instrumentation wiring (not shown) routed externally. As used herein "non-metric" refers to the rigid portion of the balance, and "metric" refers to the model flight vehicle portion of the balance. Balance 20 includes a first non-metric frame element 22 which is partially fitted within an internal bore in sting 10. Balance 20 includes a second non-metric frame element 24 in the form of an inner chamber housing which forms the inner flow passage on the non-metric portion of the balance and which fits within first non-metric frame element 22 as shown. An inner chamber nut 26 retains the aft part of inner housing 24 to the first non-metric frame element 22, and an inner chamber key 28 maintains the alignment of inner chamber housing 24. The bore within sting 10 provides the high pressure fluid flow passage into the balance. Flexure beams 30 (see FIG. 3, for example) are formed integrally (i.e., with a one-piece construction) with frame element 22 and also with a balance shell 32 which constitutes a first metric frame element which is part of the metric portion of the balance FIGS. 2 and 4 also show a flexure beam 31 integral with balance shell 32 and having axially extending arms 33 which are integrally connected at their ends as shown to frame element 22. Thus, axially developed strains between balance shell 32 and frame element 22 are measured by strain gage G' mounted on flexure beam 31. This provides an axial beam force system. First non-metric frame element 22, flexure beams 30, 31 and 33 and first metric frame element or balance shell 32 constitute an integral, one-piece unitary construction which virtually eliminates any mechanical hysteresis which might otherwise develop in the connecting structure between first non-metric frame element 22 and first metric frame element 32. As noted above, the elimination of mechanical hysteresis at the metric break (the junction between the non-metric and metric portions) yields a five-fold improvement over the prior art balances.

A balance bellows assembly 40 is provided which seals the flow passages across the metric break such that flow forces have a minimal effect on the balance. Bellows assembly 40 includes a longitudinal bellows 42, a bellows cover 44 (which is a protective cover for the bellows and prevents any escape of the bellows material in the event of a bellows failure) and a bellows housing 46 which contains bellows 42, all connected as shown. According to the invention, bellows 42 is preferably connected at two ends to one of (1) the metric portion of the balance and (2) the non-metric portion thereof and at its intermediate portion to the other of (1) the metric portion and (2) the non-metric portion of the balance. Alternatively, bellows 42 can be formed of two separate longitudinal bellows elements each having one end connected to the non-metric portion of the balance and its other end connected to the metric portion of the balance. A bellows cover nose 48 is provided in the form of a nut that retains bellows housing 46 to the inner chamber housing 24. Bellows housing 46 is fixed to one end of balance shell 32. An end cap 50 is fixed to bellows housing 46 and is located at the front end of the balance. End cap 50 functions to direct the fluid flow through two orifices leading to the model and seals the front end of the balance. End cap 50 is mounted completely on the metric portion of the balance. A plurality of bellows inserts 52 are provided to allow the fluid flow to pass from the non-metric inner chamber housing 24 and bellows 42 to the metric portion of the flow passage. Bellows inserts 52 have through holes 54 through which the high pressure fluid flows. Bellow inserts 52 fit snugly into respective holes in inner cylinder 24 and in bellows assembly 40. Bellow inserts 52 also pass through holes in bellows cover 44. The use of a longitudinal bellows 42 provides for reduced fatigue in the most compliant direction of the balance. The system includes a motor mount 56 bolted via bolt 58 to end cap 50, and a control wheel shaft 60 and roll pins 62, 64.

A temperature sensor T is disposed in the fluid-conducting passage of the balance to measure the static temperature of the fluid flow. A pressure sensor P is disposed also in the fluid-conducting passage of the balance to measure the pressure of the fluid flow. Strain gages G are mounted on flexure beams 30 to measure strain forces on the flexure beams responsive to forces acting on the model flight vehicle to be mounted on the balance. The strain gages are mounted on flexure beams 30 such that all symmetrical forces cancel. The design of the fluid-conducting passage from the non-metric portion to the metric portion of the balance is such that the internal forces within the balance are generated symmetrically. The longitudinal bellows functions to minimize any asymmetrical internal flow forces while maintaining the necessary bellows strength.

Figure 8:
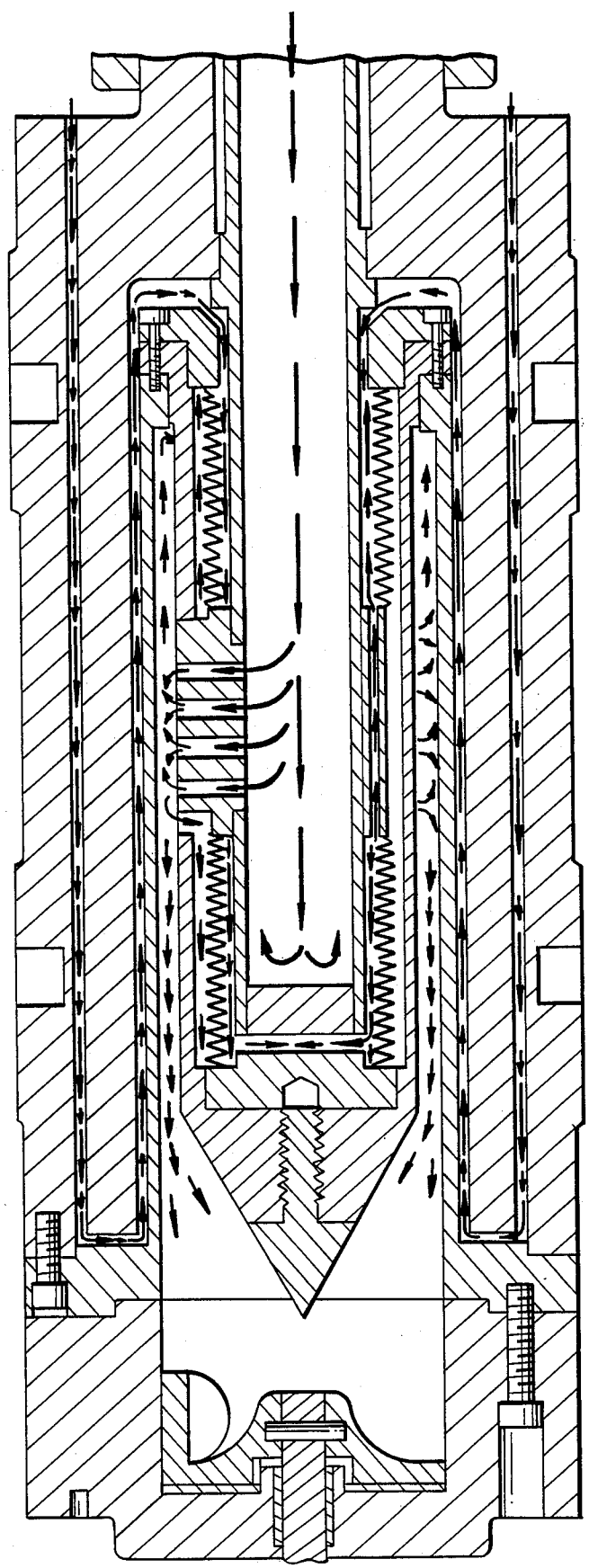
FIG. 8 schematically illustrates the fluid flow path through the balance according to the invention.

FIG. 8 illustrates schematically the flow through the balance according to the invention with entering pressurized air represented by long arrows, the flow after the metric break represented by short arrows and portions in commuinication with the ambient represented by alternate long and short arrows.

According to one practical test of the balance according to the invention, the balance has an operational pressure limit of 1500 psi and a certified maximum pressure limit of 2250 psi. The mass flow of air at 1500 psi can exceed 14 lbs/sec. The thermal effects of the balance have been calibrated for a temperature range from 30° F. to 170° F. The strain gages used are normally excited by a DC power supply up to 10 volts. The flow through balance can be used while measuring six force components, as described below:

| Gage # | Component Description | Designation | Capacity |
| --- | --- | --- | --- |
| 1 | Forward Normal Force | N1 | ± 3000 lbs. |
| 2 | Aft Normal Force | N2 | ± 3000 lbs. |
| 3 | Axial Force | A or Ax | ± 500 lbs. |
| 4 | Forward Side Force | S1 | ± 1500 lbs. |
| 5 | Aft Side Force | S2 | ± 1500 lbs. |
| 6 | Rolling Moment | RM | ± 600 ft-lbs. |

The balance according to the invention can have its internal fluid conducting passages altered to allow multiple flows to the model, with proper instrumentation locations being determined to calibrate each set of bellows asymmetric stress effects. Multiple high pressure fluid (liquid or gas) energy sources can be passed through the balance.

It should be noted that the above description and the accompanying drawings are merely illustrative of the application of the principles of the present invention and are not limiting. Numerous other arrangements which embody the principles of the invention and which fall within its spirit and scope may be readily devised by those skilled in the art. Accordingly, the invention is not limited by the foregoing description, but is

We claim:

1. A force measurement system, adapted to be connected to a sting having an internal bore, for feeding pressurized fluid through the bore in the sting; said force measurement system comprising a flow-through balance for measuring forces acting on a model flight vehicle to be mounted on said balance, said balance including:
   a non-metric frame means for mounting said balance on the sting and including a first non-metric frame element;
   a metric frame means for securing said model flight vehicle to the balance and including a first metric frame element, said non-metric frame means and said metric frame means comprising a fluid-conducting passage means, having a metric portion and a non-metric portion in fluid communication with the bore in the sting, for conveying said pressurized fluid first through said non-metric portion of said passage and then into said metric portion of said passage; and
   means for integrally connecting said first non-metric frame element and said first metric frame element, said integral connecting means including a plurality of flexure beams such that said first non-metric frame element, said first metric frame element and said flexure beams form a one-piece construction comprising means for eliminating mechanical hysteresis between said first non-metric frame element and said first metric frame element.

2. The system as in claim 1, further comprising stress control means for substantially preventing effects of temperature, pressure and said pressurized fluid from producing asymmetric internal forces in said fluid-conducting passage and asymmetric loads on said flexure beams, whereby primarily symmetrical and cancelling stresses are produced in said system by said fluid passing through said fluid-conducting passage.

3. The system as in claim 2, wherein said stress control means comprises a predetermined internal geometric configuration of said fluid-conducting passage.

4. A system as in claim 3, wherein said stress control means comprises said non-metric frame means and said metric frame means, said first metric frame element is a substantially cylindrical hollow balance shell, said first non-metric frame element includes a substantially cylindrical hollow member disposed substantially concentrically within said balance shell and said flexure beams connect adjacent end of said balance shell and said hollow member.

5. The system as in claim 4, wherein said first non-metric frame element comprises means for mounting said balance within the internal bore in the sting.

6. The system as in claim 4, wherein said non-metric frame means includes a second non-metric frame element which is a substantially cylindrical hollow member fitted within a bore in said first non-metric frame element and having an open end adapted to be disposed within the internal bore in the sting and a closed end, said balance further including a bellows assembly including (i) a bellows housing connected to said balance shell and having a substantially cylindrical hollow portion disposed concentrically with said balance shell such taht said substantially cylindrical hollow member of said second non-metric frame element is disposed between said balance shell and said substantially cylindrical hollow portion of said bellows housing, (ii) a bellows means, and (iii) a bellows cover connected to said bellows housing and disposed concentrically with said balance shell, said substantially cylindrical hollow member of said first non-metric frame element and said bellows housing, such that said bellows means is disposed longitudinally of a main flow direction of said fluid-conducting passage of said balance, said bellows means including a plurality of perforated bellows inserts located at an intermediate section of said bellows means, said bellows inserts being disposed within adjacent bores in said second non-metric element, said bellows means and said bellows cover to allow fluid communication from said non-metric portion of said fluid-conducting passage to said metric portion of said fluid-conducting passage.

7. The system as in claim 6, further comprising an end cap connected to said first metric frame element and said bellows housing, and a motor mount connected to said end cap.

8. The system as in claim 2, wherein said stress control means comprises a temperature sensor means, disposed in said fluid-conducting passage, for measuring a temperature of fluid flowing through said balance.

9. The system as in claim 2, wherein said stress control means comprises a pressure sensor means, disposed in said fluid-conducting passage, for measuring a pressure of fluid flowing through said balance.

10. The system as in claim 2, wherein said first non-metric frame element and said first metric frame element are coaxial with each other and said flexure beams are disposed symmetrically about a common axis of said first non-metric frame element and said first metric frame element to enable symmetrical forces on said flexure beams to be cancelled to enable only asymmetric forces to be measured as deviations by strain gages.

11. The system as in claim 1, further comprising a plurality of strain gages, mounted on said flexure beams, for measuring strain forces on said flexure beams responsive to forces acting on said model flight vehicle to be mounted on said balance.

12. The system as in claim 11, wherein said first non-metric frame element and said first metric frame element are coaxial with each other and said flexure beams are disposed symmetrically about a common axis of said first non-metric frame element and said first metric frame element to enable symmetrical forces on said flexure beams to be cancelled to enable only asymmetric forces to be measured as deviations by said strain gages.

13. The system as in claim 1, further comprising a longitudinal bellows member connected at two ends to one of (i) said non-metric frame means and (ii) said metric frame means and at an intermediate portion to the other of (i) said non-metric frame means and (ii) said metric frame means.

14. The system as in claim 1, further comprising at least one longitudinal bellows member connected at one end to said non-metric frame means and at its other end to said metric frame means.

* * * * *